United States Patent [19]

Linssen et al.

[11] 4,390,130

[45] Jun. 28, 1983

[54] ELECTROMAGNETICALLY ACTUATABLE VALVE

[75] Inventors: Mathias Linssen, Schesslitz; Jürgen Peczkowski, St. Ingbert-Oberwurzbach, both of Fed. Rep. of Germany

[73] Assignee: Robert Bosch GmbH, Stuttgart, Fed. Rep. of Germany

[21] Appl. No.: 207,055

[22] Filed: Nov. 14, 1980

[30] Foreign Application Priority Data

Dec. 5, 1979 [DE] Fed. Rep. of Germany ....... 2948874

[51] Int. Cl.$^3$ .......... F16K 31/06

[52] U.S. Cl. .......... 239/585; 251/141; 251/139

[58] Field of Search .......... 251/141, 138, 129, 139; 239/585

[56] References Cited

U.S. PATENT DOCUMENTS

| | | | |
|---|---|---|---|
| 3,521,854 | 7/1970 | Leiber et al. | 251/141 X |
| 3,589,672 | 6/1971 | Hoolloman | 251/129 |
| 3,768,772 | 10/1973 | Vischulis | 251/129 |
| 3,861,643 | 1/1975 | Moffatt | 251/141 X |
| 3,925,405 | 12/1975 | Arnold | 251/129 |
| 3,934,816 | 1/1976 | Terrell et al. | 251/141 |

*Primary Examiner*—Arnold Rosenthal
*Attorney, Agent, or Firm*—Edwin E. Greigg

[57] ABSTRACT

The invention relates to an electromagnetically actuatable valve, which serves in particular to inject fuel into the intake tube of mixture-compressing internal combustion engines having externally supplied ignition. The valve includes a flat armature which is firmly connected with a movable valve member which cooperates with a fixed valve seat and embodied as a ball element. The flat armature is pivotably supported on its side remote from the valve seat or on the side oriented toward the valve seat on a spring tongue preferably embodied out of a remnant air disc. The one-sided fixation of the flat armature on the spring tongue assures an unequivocal up-or-down movement of the flat armature.

7 Claims, 3 Drawing Figures

ELECTROMAGNETICALLY ACTUATABLE VALVE

BACKGROUND OF THE INVENTION

The invention relates to an electromagnetically actuatable valve for fuel injection systems of internal combustion engines. A valve is already known in which the flat armature is guided by a diaphragm held firmly in place and attached to the housing on its circumference. However, with a suspension of the flat armature via a diaphragm in this way, there is the danger that the flat armature may flutter in an uncontrolled manner before, during and after actuation.

OBJECT AND SUMMARY OF THE INVENTION

The electromagnetically actuatable valve according to the invention having the characteristics set forth has the advantage over the prior art that the flat armature is unequivocally guided during its up-and-down movement. As a result, there is an improvement in the characteristic curve of the valve. Furthermore, external friction and wear are prevented by the spring tongue joint.

As a result of the features disclosed, advantageous modifications of and improvements to the valve disclosed are possible. It is advantageous to embody the spring tongue as a remnant air disc of non-magnetic material disposed between the flat armature and the magnetic element.

It is likewise advantageous to embody the movable valve member firmly connected with the flat armature as a ball element.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
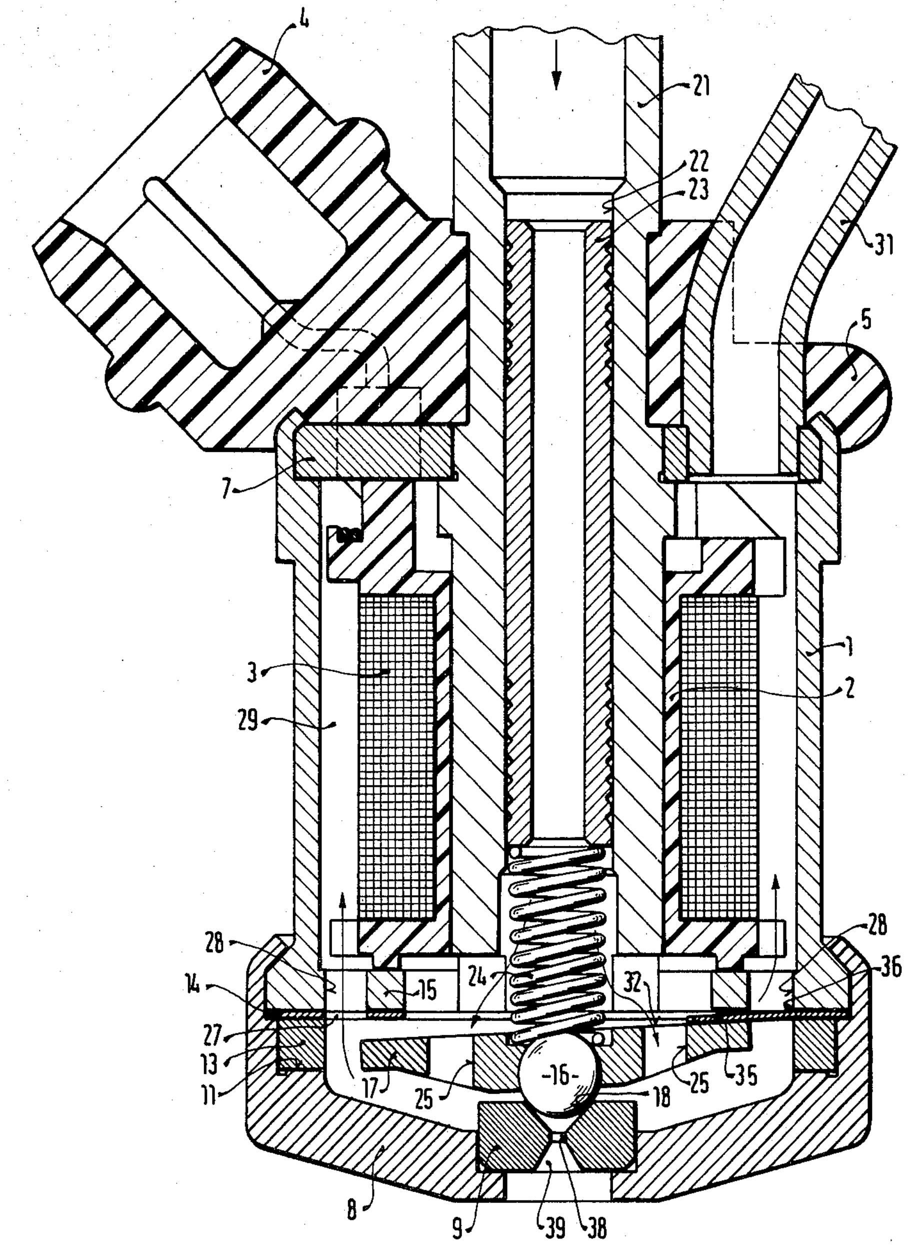
FIG. 1 shows in cross section a first exemplary embodiment of a fuel injection valve.

The fuel injection valve shown in FIG. 1 and intended for a fuel injection system serves to inject fuel, particularly at low pressure, into the intake tube of mixture-compressing internal combustion engines with externally supplied ignition. A magnetic coil 3 is disposed on a coil carrier 2 within a valve housing 1. The magnetic coil 1 is supplied with electric current via an electric plug connection 4, which is embedded in a plastic ring 5 set into place axially upon the valve housing 1. A cover plate 7 is set into the end of the valve housing 1 oriented toward the electric plug connection 4 and seals the valve housing at this end as a result of its being flanged and welded or soldered. On the end of the fuel injection valve remote from the electric plug connection 4, a nozzle carrier 8 is flanged in a sealed manner to the valve housing 1 and has a nozzle body 9 disposed therein.

A stroke ring 13 is seated on a step 11 in the interior of the nozzle carrier 8, and a remnant air disc 14 rests on the stroke ring 13. The remnant air disc 14 is held tightly in place by the pressure resulting from the flanging of the nozzle carrier 8 on the valve housing 1. The remnant air disc 14, which is manufactured of non-magnetic spring material such as a cobalt-nickel-chrome alloy, extends at least radially as well as partially over a base 14 of the valve housing 1 remote from the electric plug connection 4 and prevents magnetic adhesion of the flat armature 17 to the base 15. The remnant air disc is provided with equally spaced tongues 35 whose spacing 27 provides openings through which fuel and vapor bubbles may return to a fuel return line. A ball element 16 acts as the movable valve member, being firmly connected with a flat armature 17 and cooperating with a conically extending, fixed valve seat 18 in the nozzle body 9. The supply of fuel, such as gasoline, is effected via a central fuel inlet nozzle 21, which simultaneously acts as the core and on which the coil carrier 2 is disposed. A tube insert 23 is inserted in the inlet bore 22 of the fuel inlet nozzle 21. A closing spring 24 is supported on one end on the tube insert 23 and on the other end rests on the flat armature 17. In the nonexcited state of the magnetic element 3, 15, the closing spring 24 presses the ball element 16 against the valve seat 18 of the nozzle body 9. The fuel flowing into the fuel injection valve via the fuel inlet nozzle 21 passes through openings 25 in the flat armature 17 to the actual valve, made up of the valve seat 9, 18 and the ball element 16; from there the fuel can flow past the outer circumberence of the flat armature 17, via recesses 27 in the remnant air disc 14 and openings 28 in the base 15 of the valve housing 1, for instance, into a coil chamber 29 formed between the magnetic coil 3 and the valve housing 1. This coil chamber 29 communicates via a fuel discharge nozzle 31 with a fuel return line, not shown.

Figure 2:
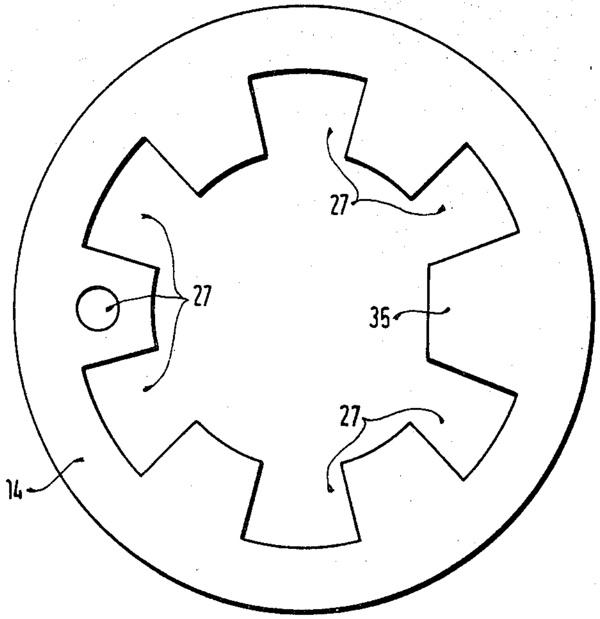
FIG. 2 shows in plan a remnant air disc with a spring tongue according to the exemplary embodiment of FIG. 1.

A spring tongue 35 is cut out of the remnant air disc 14 as shown in FIG. 2. On its end protruding out of the spring tongue tensioning point 36 on the valve housing 1, this spring tongue 35 is secured on the flat armature 17, by welding or soldering, for example, to the side 32 of the flat armature 17 remote from the fixed valve seat 18. The flat armature 17 can thus execute a pivoting movement about the spring tongue tensioning point 36 on the valve housing 1. The spring tongue 35 must not necessarily be formed from the material of the remnant air disc 14; instead, it may also be embodied as a separate element made of spring sheet metal and held in place attached to the housing. The fixation of the flat armature 17 at one side by the spring tongue 35 assures that the flat armature 17 can execute a pivotal movement solely about the spring tongue tensioning point 36.

In the excited state, the flat armature 17 is drawn up by the magnetic coil 3 and the ball element 16 opens a flowthrough cross section opposite the valve seat 17, by way of which fuel can proceed into a throttling nozzle bore 38, which also meters the fuel, provided in the nozzle body 9 and can then be ejected via an adjoining ejection port 39 which widens in conical fashion.

The embodiment of the fuel injection valve also makes it possible for fuel arriving continuously via the fuel inlet nozzle from a fuel supply line (not shown) to be carried past the valve seat 18 and, flowing around the magnetic coil 3, to flow back via the fuel discharge nozzle 31 into a fuel return line; as a result, first, any vapor bubbles created as a result of heating are carried along with the fuel to the fuel return line and, second, a continuous cooling of the fuel injection valve by the flowing fuel is assured.

Figure 3:
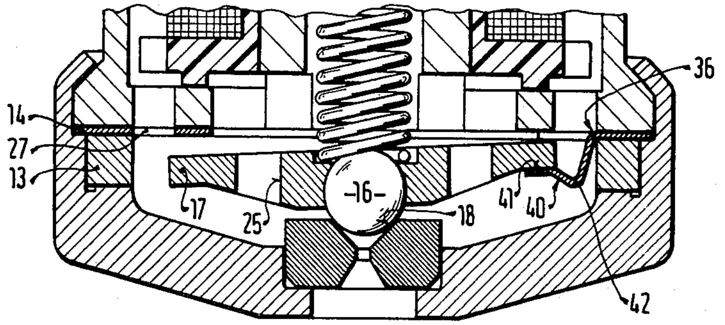
FIG. 3 shows in cross section a partial view of a second exemplary embodiment of a fuel injection valve.

In the second exemplary embodiment of a fuel injection valve as shown in FIG. 3, a spring tongue 40 is secured on the flat armature 17, by welding or soldering, for example, being attached at one end to the housing at 36 and at the other end on the side 41 of the flat armature 17 oriented toward the fixed valve seat 18. As is the case with the spring tongue 35, the spring tongue 40 must not necessarily be cut out from the body of the remnant air disc 14 rather it may also be embodied as a separate element of spring sheet metal and held in place attached to the housing. The spring tongue 40 is advantageously shaped such that in its region between the spring tongue tensioning point 36 and the point of attachment to the flat armature 17 there is a region embodied as an arc or reentrant portion 42, which extends approximately to an imaginary horizontal line extending through the center of the ball element 16, thus the pivotal movement of the flat armature 17 is executed substantially about a pivotal axis extending through this portion of the arc 42, especially when the spring tongue 42 extends in a manner like that shown for spring tongue 35 in FIG. 2, that is, narrowing toward the flat armature 17. As a result, when the ball element 16 lifts from the fixed valve seat 18, a concentric flowthrough gap is created, which in turn assures a uniform stream embodiment of the injection stream. The fixation of the flat armature 17 in accordance with the invention produces very good dynamic behavior of the valve and high metering precision, because there is neither external friction nor wear at the spring tongue joint.

The foregoing relates to two preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electromagnetically actuatable valve for fuel injection systems of internal combustion engines, including a housing, a magnetic element in said housing, a flat armature positioned relative to said magnetic element for operation by said magnetic element, said flat armature having a side, a movable valve element and a fixed valve seat in said housing, said armature being firmly connected with said movable valve element which in turn cooperates with said fixed valve seat in said housing, a remnant air disc of nonmagnetic material fixed in said housing along an edge of said disc and disposed between said flat armature and said magnetic element, said remnant air disc including recesses therein and a portion extending between said recesses therein that form a spring element, said spring element being fixedly attached to said side of said flat armature at only one location, said spring element being attached to said flat armature to provide a pivotal movement for said armature about said one location, and a closing spring disposed between said armature and said magnet element which produces a force counter to said pivotal movement of said armature.

2. A valve as defined by claim 1, characterized in that said spring element and said flat armature are welded or soldered to one another at said one location.

3. A valve as defined by claim 1, characterized in that said spring element is secured on the side of said flat armature remote from said fixed valve seat.

4. A valve as defined by claim 1, characterized in that said spring element is secured on said flat armature on said side of said flat armature oriented toward said fixed valve seat.

5. A valve as defined by claim 4, characterized in that said spring element further includes a region embodied as an arc disposed between a point of attachment between said housing and said flat armature.

6. A valve as defined by claim 1, characterized in that a ball element firmly connected with said flat armature acts as said movable valve member.

7. A valve as defined by claim 5, characterized in that said arc of said spring element extends in a direction of said fixed valve seat up to an imaginary horizontal line extending through the center of a ball element.

* * * * *